April 18, 1950  A. L. CAREY ET AL  2,504,495
FILING ATTACHMENT FOR LATHES
Filed July 23, 1946
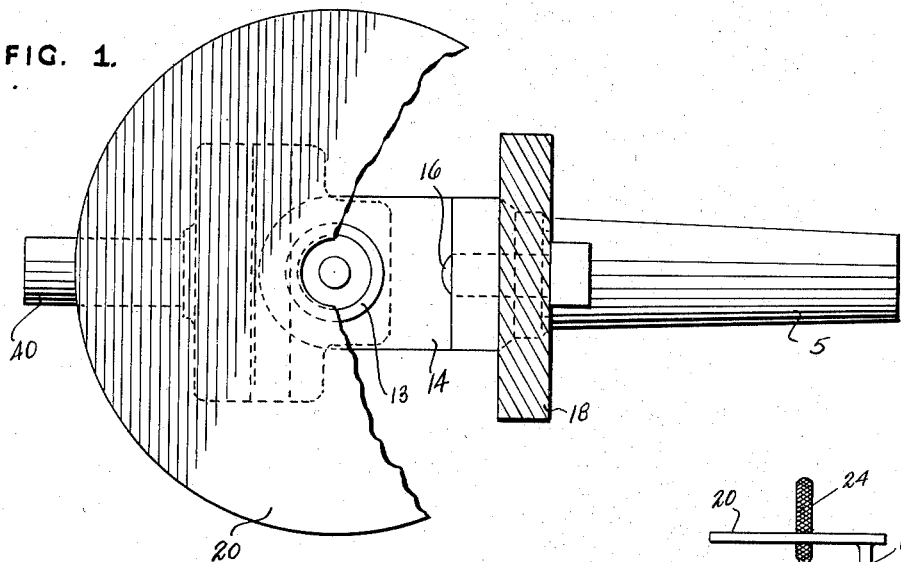
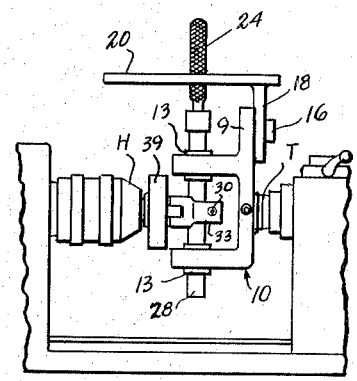
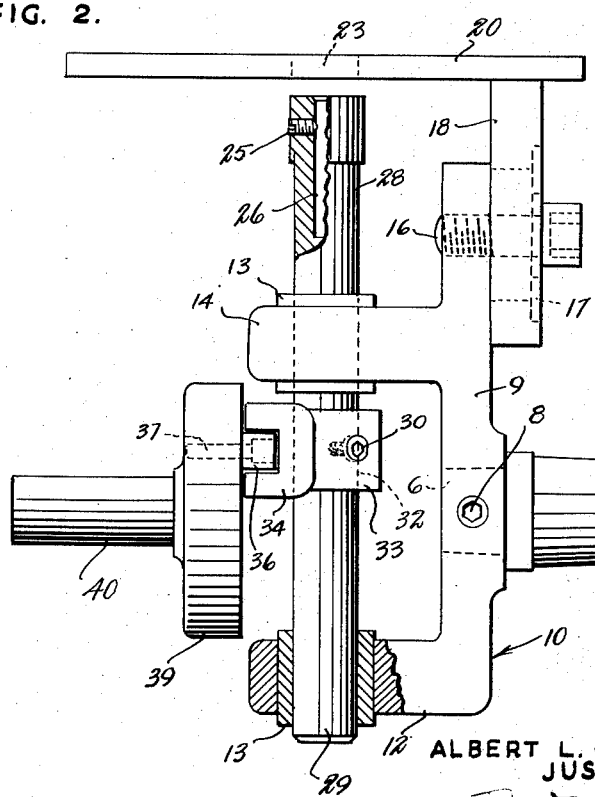
INVENTOR.
ALBERT L. CAREY, &
JUSTIN V. ANSLINGER,
BY
ATTORNEYS.

Patented Apr. 18, 1950

2,504,495

UNITED STATES PATENT OFFICE 2,504,495

FILING ATTACHMENT FOR LATHES

Albert L. Carey, Kankakee, Ill., and Justin V. Anslinger, Haubstadt, Ind.

Application July 23, 1946, Serial No. 685,726

2 Claims. (Cl. 29—76)

This instant invention relates to a lathe attachment whereby a wood and metal working lathe carrying the attachment may be converted into a metal filing machine useful in making dies, jigs and fixtures or in producing other metal or plastic articles.

The main object of the invention is to provide an attachment characterized and fitting a lathe without clamping to the base and not requiring any loose parts to put in operation.

Another object of the invention is to provide an attachment which can used be used in a vertical, horizontal or intermediate angular position as desired without set-up complications.

A still further object of the invention is to provide an attachment characterized of light weight and of simple, enduring and inexpensive construction.

With these and other objects in view as will become apparent as the invention is better understood, the same resides in the novelty of construction, combination and arrangement of parts specifically hereinafter described and distinctly claimed in the appended claims.

The description should be read in connection with the accompanying drawing illustrating a preferred embodiment of our invention and wherein:

Figure 1 is a top plan view of the attachment partly broken away.

Figure 2 is a side elevation.

Figure 3 is a reduced view of a lathe carrying the attachment.

In the drawing numeral 5 denotes a chuck arbor adapted for insertion in the tail stock of a lathe and including a short left hand tapering part 6 secured by a set-screw 8 in a corresponding hole of the vertical portion 9 of a frame 10.

The same carries at its lower end a horizontally disposed arm 12 with a hole for a vertical bearing 13 and extending in a direction opposite to that of the arbor. A second arm 14 extends in parallelism to arm 12 and is secured to or integral with the left side of the vertical portion and above the hole for the arbor. Arm 14 is also provided with a hole for a bearing 13 aligned with the bearing in the lower arm.

The vertical frame part 9 extends above the upper arm and is provided with a horizontal tapped hole for the threaded end part of a cap screw 16, the cap of which bears against a washer 17 countersunk in an arm 18. Both the washer and arm have aligned holes for the shank of the screw to adjust the screw angularly of the frame part 9.

Arm 18 extends from the lower side of a cylindrical disc 20 and adjacent the periphery thereof. The disc forms a table supporting the work to be engaged by a file 24 movable in an opening 23 formed centrally of the table and aligned with the bearings 13.

The lower end of the file may be secured by a set screw 25 in a socket 26 of a plunger 28 of bronze. The same is provided with a longitudinal groove 29 for the inner end of a set screw 30 which is tapped through a hole in a sleeve-like portion 32 of a driver 33 also including a bifurcated or channel part 34 facing away from the plunger.

In the slot or channel defined by the bifurcations of part 34 is a slide 36 pivoted intermediate its ends upon a pin 37 which extends eccentrically from the flat surface of a fly wheel disc 39. The disc is concentrically splined upon a shaft 40 insertible in the head stock H and driven thereby.

To operate the attachment arbor 5 is secured in the tail stock and shaft 40 is connected for rotation to the head stock. The table 20 is adjusted to the desired position by the manipulation of screw 16. The file 24 is secured in the socket of the plunger by the manipulation of set screw 25. Rotation of the head stock will reciprocate the plunger up and down while the slide 36 is maintained by the plunger driver in a horizontal position while rotating about pin 37. During the reciprocation of the plunger and file carried thereby, the operator may press a selected portion of the work against the file.

While it is believed that from the foregoing description the nature and advantages of the invention will be readily apparent, we desire to have it understood that what is herein shown and described, is merely illustrative of the preferred embodiment of the invention to which we do not limit ourselves, and that such changes in the combination and arrangement of parts may be resorted to when desired as fall within the scope of the subjoined claims.

What we claim is:

1. A filing attachment for a lathe having a tail stock and a head stock, said attachment comprising a support, means for mounting the support on the tail stock, a work table carried by the support, a plunger mounted on said support for reciprocation transverse to the work table, said plunger being adapted to receive a file, rotary driving means adapted to be secured to the head stock, and means secured to the plunger and actuated by said drive means for reciprocating the plunger on rotation of said driving means.

2. An attachment for a lathe having a head stock and a tail stock, comprising a chuck arbor adapted to be secured to said tail stock, a vertical frame fixed to said chuck arbor, said frame including vertically-spaced and aligned slide bearings, a plunger vertically slidable in said bearings, said plunger including an upper end formed to provide a socket for a reciprocating tool, a driver fixed to said plunger, said driver being formed with a horizontal slideway therein, a slide slidable in said slideway, a shaft adapted to be attached to said head stock, a fly wheel disc fixed on said shaft for rotation therewith, a crank pin on said disc, and said pin being pivotally connected to said slide whereby to reciprocate said slide and plunger horizontally and vertically, respectively, upon rotation of said shaft.

ALBERT L. CAREY.
JUSTIN V. ANSLINGER.

REFERENCES CITED

The following references are of record in the file of this patent:

UNITED STATES PATENTS

| Number | Name | Date |
|---|---|---|
| 552,717 | McClellan | Jan. 7, 1896 |
| 1,194,414 | Olson | Aug. 15, 1916 |
| 1,322,873 | Brull | Nov. 25, 1919 |
| 1,684,011 | Cichon | Sept. 11, 1928 |
| 2,436,692 | Greene | Feb. 24, 1948 |